United States Patent
Hutzler et al.

(10) Patent No.: US 8,823,497 B2
(45) Date of Patent: Sep. 2, 2014

(54) SECURE DATA CARD WITH PASSIVE RFID CHIP AND BIOMETRIC SENSOR

(75) Inventors: Richard Hutzler, Tucson, AZ (US); Steve Ngoc Nguyen, Pflugerville, TX (US); Nelson Jay Smith, IV, Tucson, AZ (US); Thomas Guthrie Zimmerman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 13/396,274

(22) Filed: Feb. 14, 2012

(65) Prior Publication Data

US 2013/0207786 A1    Aug. 15, 2013

(51) Int. Cl.
*H04Q 5/22*    (2006.01)

(52) U.S. Cl.
USPC ..... 340/10.51; 340/5.82; 340/10.1; 340/5.83; 340/10.42; 235/382; 235/492; 455/41.1; 726/6; 726/17

(58) Field of Classification Search
USPC .............. 340/5.82, 5.83, 10.1, 10.4; 235/382, 235/492; 455/41.1; 726/17, 6
See application file for complete search history.

(56) References Cited

U.S. PATENT DOCUMENTS

| | | | |
|---|---|---|---|
| 6,588,660 B1 * | 7/2003 | Buescher et al. | 235/382 |
| 7,028,893 B2 | 4/2006 | Goodman et al. | |
| 7,213,766 B2 * | 5/2007 | Ryan et al. | 235/492 |
| 2005/0169504 A1 | 8/2005 | Black | |
| 2005/0207624 A1 | 9/2005 | Ehlers et al. | |
| 2006/0253710 A1 | 11/2006 | Koo | |
| 2007/0046369 A1 | 3/2007 | Schober et al. | |
| 2007/0069010 A1 | 3/2007 | Mestres et al. | |
| 2007/0073619 A1 | 3/2007 | Smith | |
| 2008/0014867 A1 * | 1/2008 | Finn | 455/41.1 |
| 2008/0106379 A1 * | 5/2008 | Haddock | 340/10.1 |
| 2008/0201265 A1 | 8/2008 | Hewton | |
| 2009/0322477 A1 * | 12/2009 | Celorio | 340/5.82 |
| 2010/0039234 A1 | 2/2010 | Soliven et al. | |
| 2010/0117794 A1 * | 5/2010 | Adams et al. | 340/5.83 |
| 2010/0231362 A1 * | 9/2010 | Smith et al. | 340/10.42 |
| 2011/0102141 A1 * | 5/2011 | Wu | 340/5.82 |
| 2011/0162064 A1 * | 6/2011 | Powell et al. | 726/17 |
| 2012/0174198 A1 * | 7/2012 | Gould et al. | 726/6 |

FOREIGN PATENT DOCUMENTS

EP    1420359 A1    5/2004

* cited by examiner

*Primary Examiner* — Daniel Wu
*Assistant Examiner* — Israel Daramola
(74) *Attorney, Agent, or Firm* — Eric A. Gifford

(57) ABSTRACT

Biometric authorization is provided for a passive secure data card. An additional layer of security may be provided in the form of a biometric password. Session timing may be enforced to limit opportunities of third parties to snoop transmitted information while providing ample time to complete the card transaction. Biometric retries may be enforced to limit opportunities of third parties to hack the biometric security.

18 Claims, 6 Drawing Sheets

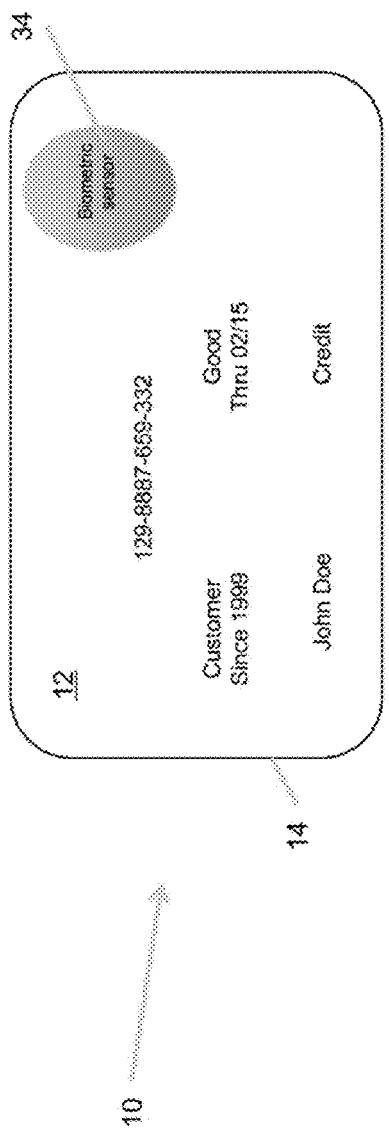
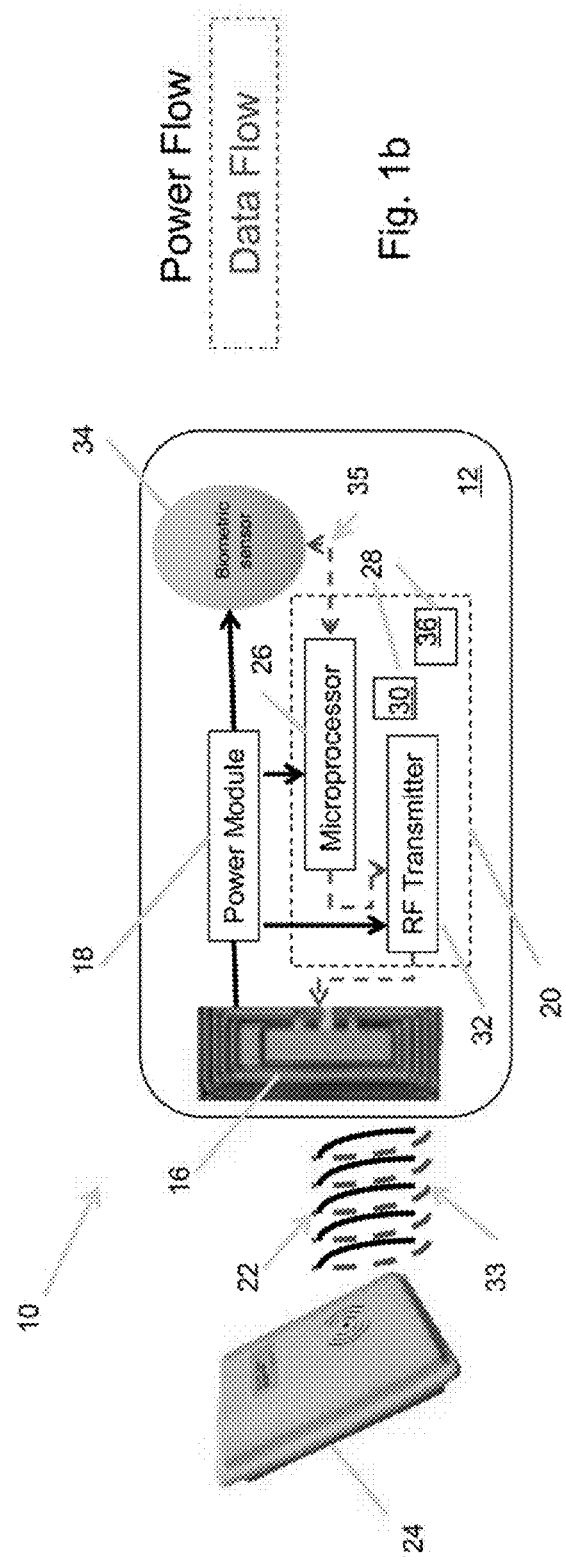

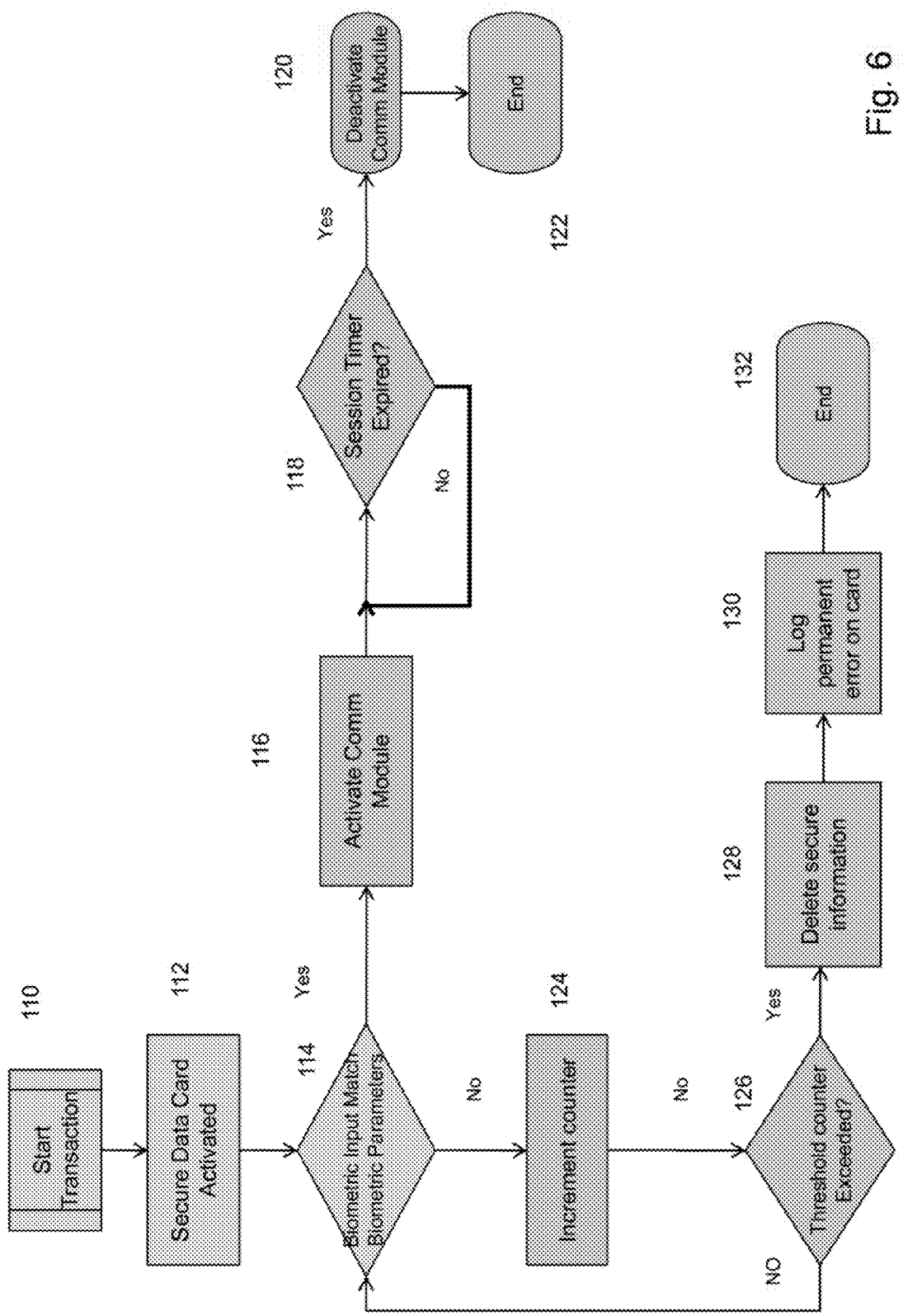

SECURE DATA CARD WITH PASSIVE RFID CHIP AND BIOMETRIC SENSOR

BACKGROUND

1. Field of the Invention

The present invention relates to secure data cards with passive RFID chips, and more specifically, to the integration of a biometric sensors and security into passive secure data cards.

2. Description of the Related Art

Radio-frequency identification (RFID) is a technology that uses radio waves to transfer data from an electronic tag, called an RFID tag, label or secure data card, attached to an object, through a reader for the purpose of identifying and tracking or monitoring the object. Some RFID tags can be read from several meters away and beyond the line of sight of the reader. The application of bulk reading enables an almost-parallel reading of tags.

The tag's information is stored electronically. The RFID tag includes a small RF transmitter and receiver. An RFID reader transmits an encoded radio signal to interrogate the tag. The tag receives the message and responds with its identification information. Most RFID tags contain at least two parts: one is an integrated circuit (i.e. the RFID chip) for storing and processing information, modulating and demodulating a radio-frequency (RF) signal, and other specialized functions; the other is an antenna for receiving and transmitting the signal.

A number of organizations have set standards for RFID, including the International Organization for Standardization (ISO), the International Electrotechnical Commission (IEC), ASTM International, the DASH7 Alliance and EPCglobal. (Refer to Regulation and standardization below.) There are also several specific industries that have set guidelines including the Financial Services Technology Consortium (FSTC) has set a standard for tracking IT Assets with RFID, the Computer Technology Industry Association CompTIA has set a standard for certifying RFID engineers and the International Airlines Transport Association IATA set tagging guidelines for luggage in airports.

RFID can be used in many applications. A tag can be affixed to any object and used to track and manage inventory, assets, people, etc. For example, it can be affixed to cars, computer equipment, books, mobile phones, etc. The Healthcare industry has used RFID to reduce counting, looking for things and auditing items. Many financial institutions use RFID to track key assets and automate compliance. Also with recent advances in social media RFID is being used to tie the physical world with the virtual world. RFID in Social Media first came to light in 2010 with Facebook's annual conference.

RFID is a superior and more efficient way of identifying objects than manual system or use of bar code systems that have been in use since the 1970s. It is not necessary to "show" the tag to the reader device, as with a bar code. In other words it does not require line of sight to "see" an RFID tag, the tag can be read inside a case, carton, box or other container, and unlike barcodes RFID tags can be read hundreds at a time. Bar codes can only be read one at a time.

RFID tags can be either passive, active or battery assisted passive. Passive RFID does not use a battery; instead the tag uses the radio energy transmitted by the reader as its sole energy source. An active tag has an on-board battery that always broadcasts or beacons its signal. A battery-assisted passive (BAP) has a small battery on board that is activated when in the presence of a RFID reader.

A primary RFID security concern is the illicit tracking of RFID tags. World-readable tags are activated in the presence of a RFID reader and broadcast their information in an "open format" that can be read by a standard reader. Tags, which are world-readable, pose a risk to both personal location privacy and corporate/military security. Active tags may broadcast continuously. Passive and BAP tags may broadcast as long as the tag is in the presence of a reader signal.

One security technique is to store the RFID tag in a cardholder that forms a "Faraday Cage", which blocks the RFID reader signal from activating the card. This approach is generally limited to the use of RFID tags by people who can remove the card to allow it to be read and then replace the card in the cage. This is both inconvenient to the user and blocks approved albeit stealthy monitoring of the cards. Furthermore, if the card is stolen there is no protection. Another approach is to encode the broadcast information on a "closed format". However, this requires the RFID reader to have specific permission to read the card. Another approach that has been considered is to provide the card with a biometric sensor such as a finger print sensor to activate the card. Biometric security has been limited to active or battery-assisted passive cards (see U.S. Pat. No. 7,028,893, US Pub. 2000/080201265 and EP1420359).

BRIEF SUMMARY

In view of the foregoing, various secure data card embodiments with a passive RFID chip and biometric sensor are provided.

According to one embodiment of the present invention, a secure data card, comprises at least one biometric sensor to sense biometric inputs from a card user and generate biometric input signals, at least one RFID chip, antenna tuned to, receive an RF reader signal and a passive power module that converts power drawn exclusively from the reader signal to power the biometric sensor and RFID chip. The RFID chip comprises an RF transmitter and one or more processors and memory units configured to implement a communication module that stores information and when activated reads and sends the information to the RF transmitter to transmit an RF data signal via the antenna and a biometric module that stores biometric parameters, and in response to biometric input from the biometric sensor compares the biometric input signal to the stored biometric parameters and, upon determination of a match activates the communication module. In embodiments the card preferably transmits the RF data signal in an open format to maintain backward compatibility with an installed base of RFID card readers.

According to an embodiment of the present invention, upon determination of a match the biometric module activates the communication module for a specified session time period provided power is still available from the reader signal. The session time period may be just long enough to transmit the RF data signal once to complete a transaction or a specified Multiple or may be user defined during card initialization.

According to an embodiment of the present invention, the biometric module stores a connection attempt threshold and counts a card user's number of attempts to provide the biometric inputs to match the biometric parameters. If the connection attempt threshold is exceeded, the biometric module permanently alters the secure information stored with the communication module and suitably the biometric parameters stored with the biometric module. The biometric module may overwrite the information with a permanent error that is transmitted if and when the card is energized by a reader signal. The permanent error may, for example, cause the card to be confiscated or generate a signal indicating the attempted use of a disabled card.

According to an embodiment of the present invention, the stored biometric parameters comprise a user-initialized biometric password of at least two temporally displaced entries of one or more user-initialized biometric inputs (e.g. thumb print or forefinger print) from one or more biometric sensors. A password may comprise at least a first entry for the first user-initialized biometric input and a temporally displaced second entry for the second user-initialized biometric input. A password may comprise at least a temporally displaced third entry for either the first or second biometric inputs. The user-initialized biometric password provides an additional layer of biometric security. The biometric password may be used with biometric sensors in passive, battery-assisted passive or active secure data cards.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which:

FIGS. 1a and 1b are views of an embodiment of a passive secure data card;

FIG. 6 is a flow diagram of an embodiment of steps performed by the card to perform a transaction.

DETAILED DESCRIPTION

Figure 2:
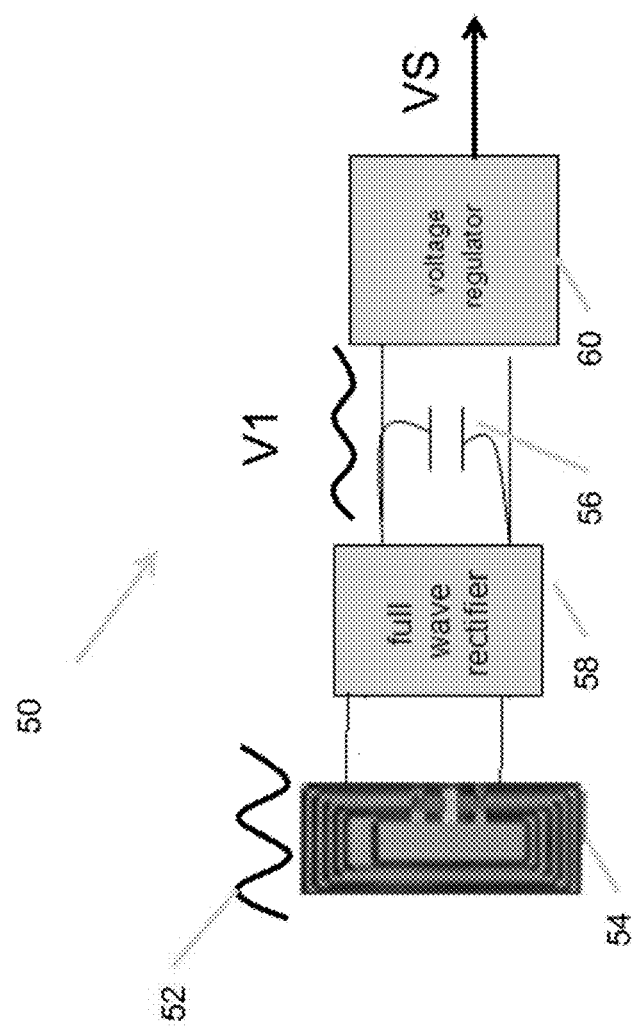
FIG. 2 is a diagram of an embodiment of a passive power module for drawing power exclusively form an RF reader signal to power the card.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best, understood by reference to, the drawings, wherein like parts are designated by like numerals throughout.

In view of the foregoing, various secure data card embodiments are provided. Biometric authorization is provided for a passive secure data card. An additional layer of security may be provided in the form of a biometric password. Session timing may be enforced to limit opportunities of third parties to snoop transmitted information while providing ample time to complete the card transaction. Biometric attempts may be enforced to limit opportunities of third parties to hack the biometric security.

With reference now to FIGS. 1a and 1b, an embodiment of a passive secure data card 10 comprises a card 12. Card 12 may be of any size suitable for an intended application. For example, for a typical consumer point-of-sale (POS) application card 12 may be the size of a typical credit card. Card 12 may be formed from any suitable material e.g. plastic. Certain unsecured information 14 may be imprinted onto the card. For example, a user name, account number, expiration date etc. The content of any unsecured information 14 will depend on the application for which the card is used. The information may be, specific to a particular user to whom the card is assigned to a particular object to which the card is attached.

The RFID technology of card 10 is implemented with an antenna 16, a passive power module 18 and at least one (typically one) RFID chip 20. Antenna 16 is configured to receive an RF reader signal 22 from a card reader 24. Passive power module 18 converts power drawn exclusively from the received reader signal 22 to power RFID chip 20. If card 10 is not in sufficiently close proximity to card reader 24 the card will not be powered on. What constitutes "sufficiently close proximity" depends on the transmit power of the card reader and the power requirements of the card. Distances of less than 1 m are typical for passive data cards.

RFID chip 20 comprises at least one (typically one) microprocessor 26 and one or more memory units 28 configured to store secure information 30 about the user or object and when activated read and send the secure information to an RF transmitter 32 to transmit an RF data signal 33 via antenna 16. Memory units 28 may comprise processor memory within processor 26 or chip-level memory accessible by processor 26. The RF data signal 33 may or may not be transmitted at the same frequency as the reader signal. In embodiments the card preferably transmits the RF data signal in an "open format" to maintain backward compatibility with an installed base of RFID card readers. The "open format" is a format that is both compatible with existing card readers and one that does not require specific knowledge or permissions to read.

The RFID technology of card 10 is further configured to include one or more biometric sensors 34 formed on card 12. In this example, a pair of biometric sensors 34 is; provided on the front and back of card 12. Biometric sensors 34 receive power from passive power module 18 drawn exclusively from the reader signal. Consequently biometric sensors 34, like RFID chip 20, are only powered on when in sufficiently close proximity to a card reader that is broadcasting a reader signal. When powered, each biometric sensor 34 is configured to sense a biometric input (e.g. fingerprint of a thumb or forefinger) from a card user and generate a biometric input signal 35 (e.g. a digital image of the fingerprint or specific features of the fingerprint) that is passed to the RFID chip's microprocessor 26.

Technology for implementing biometric sensors 32 and fingerprint authentication is commercially available. AuthenTec offers its AES850 product as a multi-function smart sensor that provides fingerprint authentication functions that could be integrated with the smart data card. Other available fingerprint sensors include Upek TouchStrip swipe sensor TCS3, Fujitsu MBF300, LighTuning LTI C300, Sony CXA362IGE and BMF-Hitachi BLP-100.

Different embodiments of secure data card 10 may employ biometric sensors and matching algorithms that sense biometric inputs other than fingerprints. For example, ridgelines on a knuckle, crease lines of a palm or a scar pattern may be valid biometric inputs. Biometric sensors that sense biometric inputs other than skin patterns may be considered.

Biometric parameters 36 representative of user-initialized biometric inputs (e.g. a digital image of the fingerprint or specific features of the fingerprint) are stored in the one ore more memory units. Biometric parameters 36 may represent a single biometric input (e.g. a thumbprint), or a pair of simultaneously biometric inputs (e.g. thumb and forefinger prints) or a user-initialized biometric password defined as a sequence of at least two temporally displaced entries of one or more user-initialized biometric inputs from one or more biometric sensors. A password may comprise at least a first entry for the first user-initialized biometric input (e.g. thumbprint) and a temporally displaced second entry for the second user-initialized biometric input (e.g. forefinger print). A password may comprise at least a temporally displaced third entry for either the first or second biometric inputs. The user-initialized biometric password provides an additional layer of biometric security. The biometric password may be used with biometric sensors in passive, battery-assisted passive or active secure data cards.

Microprocessor 26 compares the biometric input signal 35, or temporal sequence of input signals 35, to the stored biometric parameter's 36 and determines whether there is a match. A "match" does not have to be a perfect match; it must only satisfy the criteria for a match set forth in the processing algorithms. Such criteria are Well known for determining a fingerprint match. In the case of a biometric password, a "match" must not only match each biometric input to the user-initialized biometric input but must also match the temporal sequence of the password (e.g. thumb, thumb, forefinger, forefinger).

Upon determination of a match, microprocessor 26 "activates" the standard RFID technology to read the secure information from memory and pass it to RF transmitter 32 to transmit RF data signal 33 via antenna 16. Activation of the RFID technology to transmit the secure information requires both power to the card and a biometric match. Activation may also require an enabling code be sent with, the reader signal or a challenge and response between the card reader and card, which is standard RFID technology. In an embodiment, once a biometric match is determined the card continues to transmit the secure information as long as the reader signal is received. In another embodiment, the initial biometric match initializes a clock, the card transmits the secure information until the expiration of a specified session time period provided the reader signal is still being received to power the card. This "time period" may be set to allow just enough time for the card to transmit the secure information a single time or a set number of times. Alternately, the user may set the time period at card initialization.

If the microprocessor 26 determines the input data signal(s) do not match the biometric parameters, the user may be allowed to retry. The card may be configured to allow for an unlimited number of attempts without restriction. Alternately, the card may be configured to allow only a specified number of attempts, total or within a certain time period, before the card is permanently deactivated. For example, if the number of unsuccessful attempts exceeds a connection attempt threshold, the microprocessor may delete, alter or otherwise destroy the secure information and biometric parameters stored on the card. The card may overwrite the secure information with a permanent error code that is then transmitted when a reader signal is received. The error code may, for example, direct the secure data card to be confiscated or provide information to track the card.

With reference now to FIG. 2, an embodiment of a passive power module 50 that powers the RFID chip and biometric sensor(s) with power drawn exclusively from the reader signal is depicted. The RF reader signal induces an AC current 52 to flow in the card's antenna 54. Passive power module 50 comprises a capacitor 56, a full wave rectifier 58 that rectifies the AC current to produce an unregulated voltage V1 across the capacitor and a voltage regulator 60 that smoothes the unregulated voltage to supply one or more regulated voltages as long as the RF reader signal is received. If the RFID chip and biometric sensors require the same voltage, the module is configured with a single voltage regulator to output a single regulated voltage VS. If the RFID, chip and biometric sensors require different voltages, a pair of voltage regulators may be used to output regulated voltages VS1 and VS2. The pair of regulators may be connected in parallel to the full wave rectifier or in series with the second regulator providing a stepped down voltage from the first regulator. Other circuit topologies may be implemented to draw power solely from the reader signal to provide the power requirements of the RFID chip and biometric sensor(s) on the passive secure date card.

Figure 3:
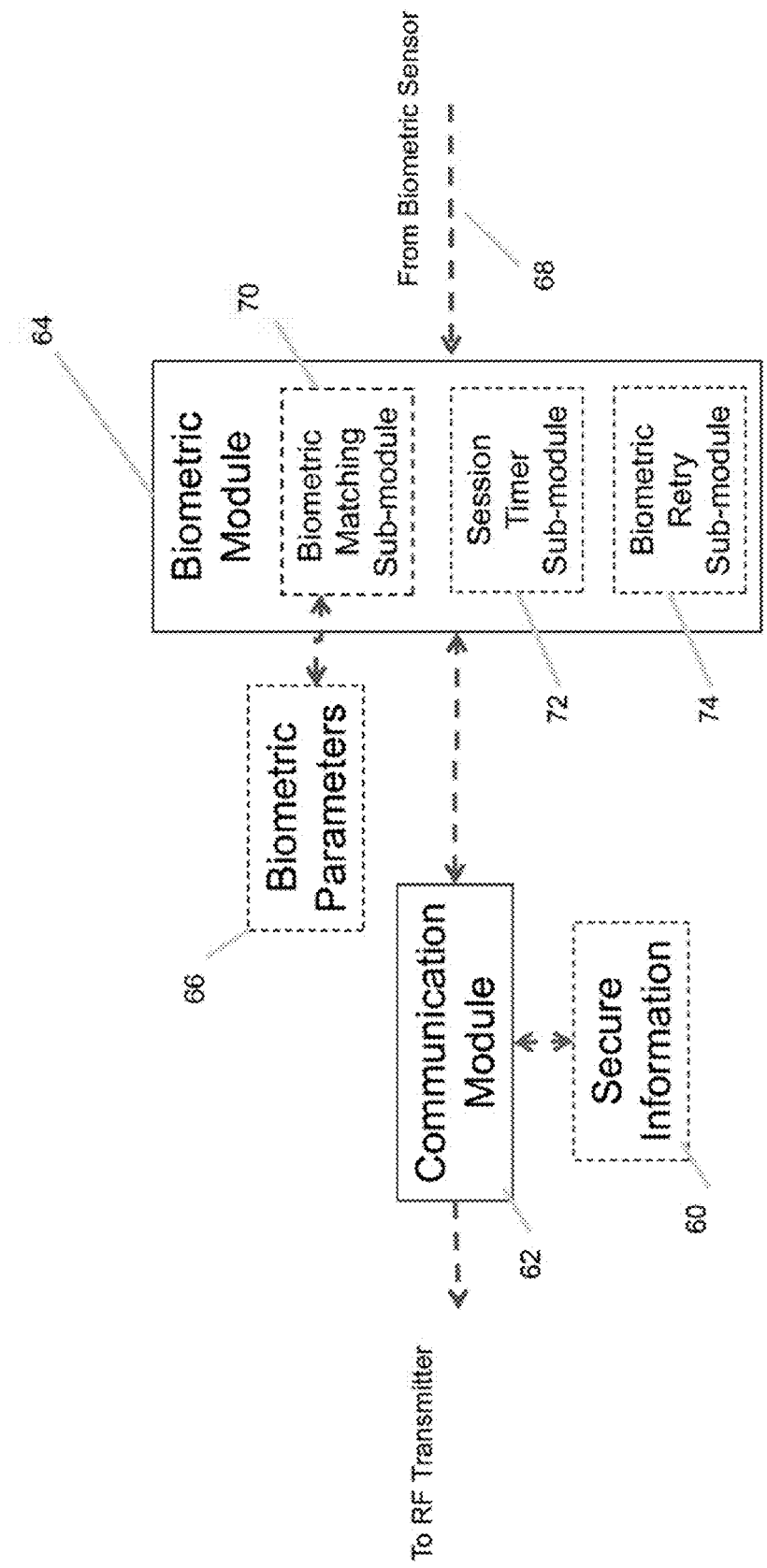
FIG. 3 is a block diagram of an embodiment of processing modules implemented on the RFID chip.

With reference now to FIG. 3, an embodiment of functional processing modules and sub-modules implemented on one or more microprocessors and one or more memory units on the RFID chip is illustrated for providing a passive secure data card with different levels of biometric security. In a passive secure data card sans biometric security, secure information 60 is stored in one or more memory units. When power is extracted from the reader signal to power the RFID chip, a communication module 62 reads secure information 60 from memory and sends the information to the RF transmitter, which in turn transmits the information in a secure data signal. In addition to power, communication module 62 may receive a code in the reader signal to activate or may issue a response to a challenge to activate. Once activated, the communication module would continuously transmit the secure information as long as power is available.

Biometric security provides additional control over the activation of communication module 62 and possible deactivation of the module. Even though power is available and any "handshaking" has been performed with the card reader, the communication module will not activate and transmit the secure information until activated by a biometric module 64. At initialization, biometric parameters 66 are stored in one or more memory units. As previously described, the biometric parameters may be a single biometric input, a pair of biometric inputs or a biometric password of temporally displaced inputs. During use, a biometric input signal(s) 68 is received from one or more biometric signals.

Biometric module 64 includes a biometric matching sub-module 70, a session time sub-module 72 and a biometric retry sub-module 74. The biometric module 64 functions as a controller to manage the sub-modules and to communicate with the biometric sensors and the communication module. Biometric matching sub-module 70 compares the input data signal or signals 68 to biometric parameters 66 to determine if there is a match and returns a signal to the biometric module indicating a positive match or a negative match. If the sub-module determines a positive match, biometric module 64 sends a signal to activate communication module 62, which in turn reads and sends the secure information to the RF transmitter.

Upon determination of a positive match and activation of the communication module, the biometric module may call session timer sub-module 72. Session timer sub-module 72 starts a clock and upon expiration of a specified session time period returns an expiration signal to the biometric module. The biometric module in turn sends a signal to deactivate communication module 62, thereby terminating transmission of the secure information.

Upon determination of a negative match, the biometric module may call biometric retry sub-module 74. Biometric retry sub-module 74 increments a counter each time a negative match is received. The counter may reset to zero after a reset time period. If the counter exceeds a connection attempt threshold, the retry sub-module 74 sends returns an error signal. The reset time period (if any) and the threshold may be hardcoded or set by the user during initialization. The biometric module sends a signal to the communication module causing the secure information to be permanently altered or destroyed. For example, the signal may cause the power module to overcharge the RFID chip and physically damage or destroy the memory. Alternately, the signal may cause the secure information to be permanently overwritten with an error code. If and when the card is powered on, the communication module transmits the error code to the card reader, which may result in confiscation of the card by a person or machine or tracking of the card. The biometric module may also send a signal alter, destroy or overwrite the biometric parameters.

Figure 4:
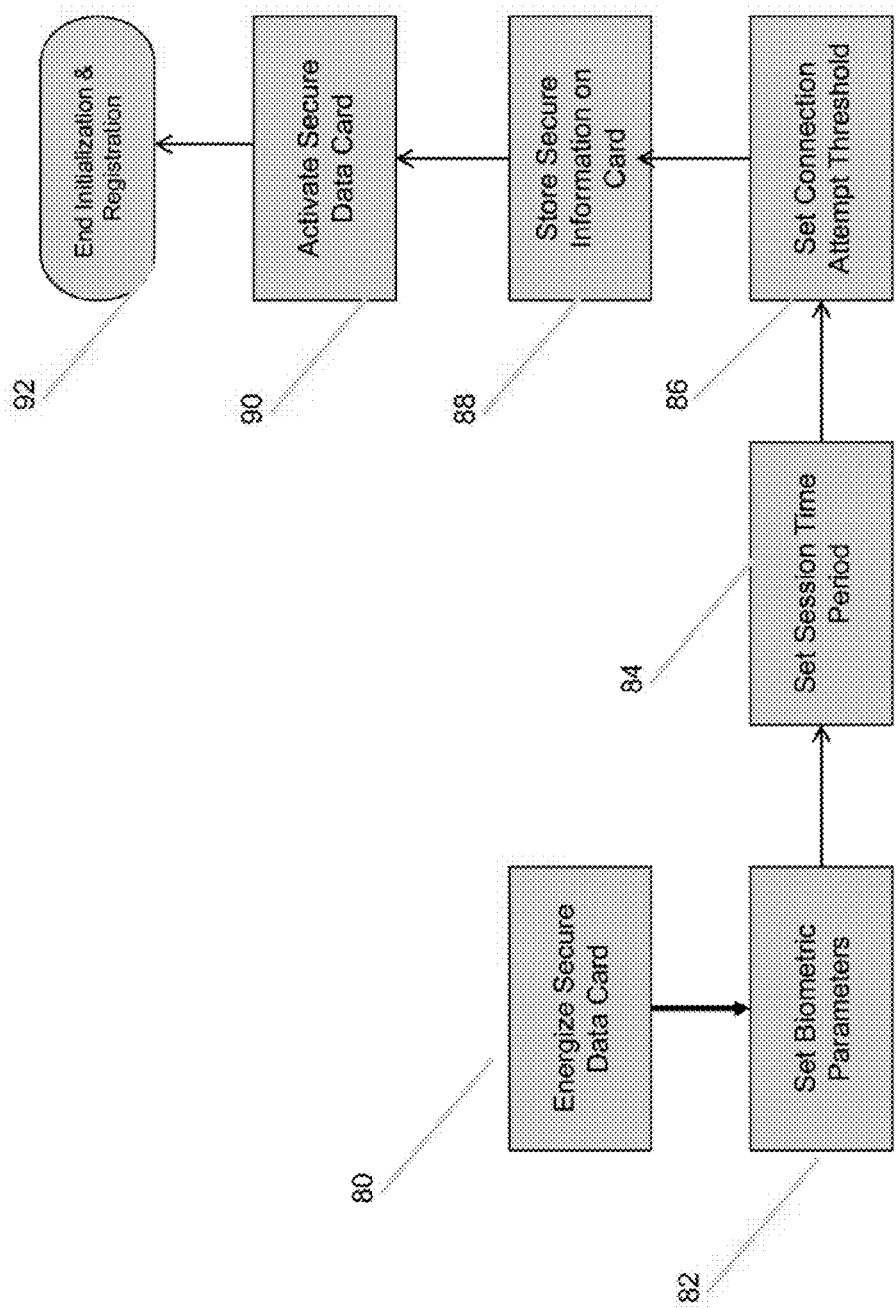
FIG. 4 is a flow diagram of an embodiment for card initialization and registration.

With reference to FIG. 4, an embodiment for initialization and registration of a passive secure data card with biometric security is described. A user may initialize and register a passive secure data card via a kiosk (e.g. at a company, business, homeland security office or military installation) or home computer that includes a card reader. Prior to initializing the card, the user may be required to input data into the kiosk or home computer to set up an account, enter personal information, enter or confirm the secure information that will be stored on the card etc. System software implemented on the kiosk or home computer will guide the user through the initialization and registration process.

Once this is complete, the user places the secure data card in sufficiently close proximity to the card reader to energize the secure data card (step 80), which activates the biosensor and RFID chip. During initialization and registration, data from the system software resident in the kiosk or home computer may be communicated to the card via the reader signal. The communication module processes the data and passes appropriate information to the biometric module.

The user provides the biometric inputs via one or more biometric sensors on the card to set the biometric parameters (step 82). The user may be directed to input a specific sequence such as a "thumbprint" or "thumbprint and forefinger print" simultaneously on sensors on front and back of the card. In this case, the biometric security wholly resides in the uniqueness of the user's thumbprint of forefinger print. Alternately, the user may be directed to input a temporal sequence of their choosing of between, for example, 3-5, temporally displaced biometric inputs on the one or more sensors (e.g. thumb, thumb, forefinger, forefinger, thumb). This sequence known only to the user creates a biometric password that provides an additional layer of biometric security. Once the user has completed the biometric inputs the system tray prompt the user to repeat the process to verify the biometric inputs and password.

The session time period is =set (step 84). Either the system for user may set this time period. The system may estimate the amount of time it will take the card, once activated by the biometric authentication, to read and transmit the secure information. The system may set a session time period that is just long enough to transmit the RF data signal once, twice or a specified number of times. Alternately, a user may specify the session time period.

The connection attempt threshold is set (step 86). Either the system or the user may set the connection attempt threshold specifying the number of retries (total or within a connection attempt time period) that the card will accept before overwriting the information on the card and logging a permanent error. If the threshold is set for a time period, either the system or user may set the time period.

The secure information is stored on the card (step 88). Secure information may be stored on the card via the reader signal at the time of initialization and registration. Alternately, secure information could be stored on the card prior to the initialization process via a reader signal or other interface. How the secure information is stored on the card will depend on the particular application for the card. For example, a user may be provided with a "blank" secure data card in which case all of the secure information and biometric security information is downloaded and, stored during initialization and registration. Alternately, a user may be provided with a "personalized" secure data card in which the secure information, and other information is already stored on the card. In this case, the user only sets the biometric security information during initialization and registration. The order of the steps 82-88 is interchangeable.

Figure 5:
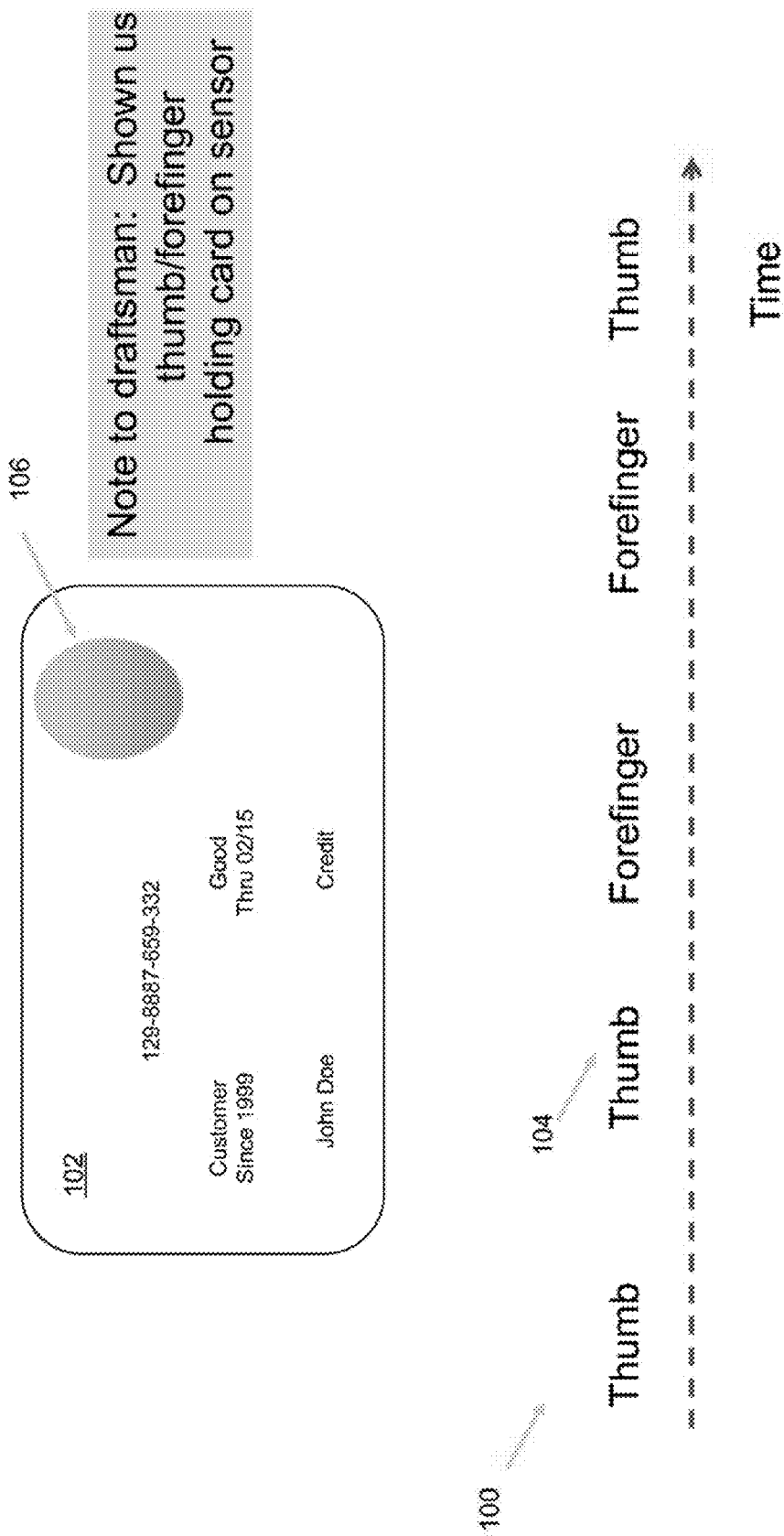
FIG. 5 is a diagram illustrating an embodiment of either the initialize or use of a biometric password.

Once all of the biometric security information and secure information are stored in the secure data card, the secure data card is "activated" (step 90). The system may prompt the user to attempt a transaction to verify that the biometric security and security settings and transmission of the secure information are working properly. Once verified, the initialization and registration process ends (step 92) and the passive secure data card its ready to be used With reference to FIG. 5, an embodiment for creating and storing a biometric password 100 in a secure data card 102 is illustrated. The biometric password 100 comprises at least two temporally displaced entries 104 of one or more user-initialized biometric inputs. In this example, biometric password 100 includes five temporally displaced entries selected from two biometric inputs (thumbprint and forefinger print) input via two separate biometric sensors. A biometric, sensor 106 on the front, of the card for the thumbprint and a biometric sensor (not shown) on the back of the card. During initialization, the user will create the password using his or her thumb and forefinger in a desired temporal sequence. The card will store the biometric parameters for the thumb, forefinger and a temporal sequence of the combination. The user may be prompted to reenter the sequence to confirm the password. During use of the card, the user is expected to enter the same sequence of biometric inputs. The card determines if each biometric input is a match and if the entire sequence is a match in order to determine a positive match.

With reference to FIG. 6, an embodiment for using a secure data card with biometric, security is illustrated. To start a transaction (step 110), a passive secure data card activated (step 112) by placing the card is close proximity to a card reader. Close proximity may or may not require contact between the card reader and the card depending on the application. A user enters a biometric input or sequence of biometric inputs via one or more biometric sensors. The card determines whether the biometric inputs match the stored biometric parameters or password (step 114). If a positive match is determined, the card activates the communication module (step 116) to read and transmit the secure information. The card may then initiate and monitor a clock to determine if a session timer has expired (step 118). If not, the communication module remains active. If yes, the card deactivates the communication module (step 120) and ends the sessions (step 122). If the user was not able to complete the desired transaction, he or she may restart the entire process.

If a negative match is determined in step 114, the card increments a counter (step 124). The counter may be reset to zero upon determination of a positive match or after the expiration of a retry time period. The card determines whether the counter exceeds a connection attempt threshold counter (step 126). If no, the user may retry to provide the correct biometric inputs to activate the card until the threshold counter is exceeded. If yes, the card may delete the secure information (step 128) and, log a permanent error, on the card (step 130) and end the session (step 132).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus, to produce a machine, such that the instructions, which execute via the processor of the computer or other programmable data processing apparatus, create means for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "Comprising," when used in this specification, specify the presence of stated, features, integers, steps, operations, elements, and/or components, but do not preclude the presence or addition of one or more other features, integers, steps, operations, elements, components, and/or groups thereof.

The corresponding, structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable other of ordinary skill in the art to understand the invention for various embodiments with various modifications as are suited to the particular use contemplated.

What is claimed is:

1. A passive secure data card, comprising:
   a card;
   an antenna tuned to receive an external RF reader signal;
   a passive power module coupled to the antenna, said passive power module converting power drawn exclusively from the external RF reader signal to supply one or more voltages to a biometric sensor and at least one radio frequency identification (RFID) chip;
   said biometric sensor configured to sense a biometric input from a card user and generate a biometric input signal, said biometric input and biometric input signal providing distinctive and measurable characteristics to identify individual card users; and
   said at least one RFID chip comprising an RF transmitter and one or more processors and memory units configured to implement a communication module that stores information and a biometric module that stores biometric parameters representative of user-initialized biometric inputs, and in response to biometric input from the biometric sensor compares the biometric input signal to the stored biometric parameters and, upon determination of a match authenticates and authorizes that card user and activates the communication module, which in turn reads and sends the information to the RF transmitter to transmit an RF data signal via the antenna, wherein said communication module, although power is available from the external RF reader signal, will not active and transmit the information until activated by the biometric module.

2. The secure data card of claim 1, wherein upon determination of the match, said biometric module activates the communication module for a specified session time period provided power is still available from the external RF reader signal.

3. The secure data card of claim 2, wherein said specified time period is just long enough to transmit the RF data signal.

4. The secure data card of claim 2, wherein said specified time period is user defined during card initialization.

5. The secure data card of claim 1, wherein the stored biometric parameters comprise a user-initialized biometric password of at least two temporally displaced entries of one or more user-initialized biometric inputs, said biometric module compares a temporal sequence of the biometric input signals to the biometric password to determine whether a match exists.

6. The secure data card of claim 5, wherein said biometric password comprises at least a first entry for a first user-initialized biometric input and a second entry for a different second user-initialized biometric input.

7. The secure data card of claim 1, wherein the card transmits the RF data signal in an open format to maintain backward compatibility with an installed base of RFID card readers.

8. The secure data card of claim 1, wherein the biometric module stores a connection attempt threshold and counts a card user's number of attempts to provide the biometric inputs to match the biometric parameters, and upon exceeding the connection attempt threshold said biometric module permanently alters the information stored with the communication module.

9. The secure data card of claim 8, wherein said biometric module writes a permanent error to the card that is transmitted as the RF data signal.

10. The secure data card of claim 8, wherein said biometric module alters the biometric parameters stored on the card.

11. The secure data card of claim 1, wherein the passive power module supplies at least a first voltage to supply power to the biometric sensor and a second voltage to supply power to the RFID chip where said first and second voltages are supplied at different voltage levels.

12. The secure data card of claim 1, wherein external RF reader signal induces an AC current in the antenna, said passive power module comprises a capacitor, a full wave rectifier that rectifies the AC current to produce an unregulated voltage across the capacitor and a voltage regulator that smoothes the unregulated voltage to supply the one or more voltages as long as the external RF reader signal is received.

13. A passive secure data card, comprising:
a card;
an antenna tuned to receive an external RF reader signal;
a passive power module coupled to the antenna, said passive power module converting power drawn exclusively from the external RF reader signal to supply one or more voltages to one or more biometric sensors and a radio frequency identification (RFID) chip as long as the external RF reader signal is received;
each said biometric sensor configured to sense a biometric input from a card user and generate a biometric input signal, said biometric input and biometric input signal providing distinctive and measurable characteristics to identify individual card users; and
said RFID chip comprising:
an RF transmitter, and
one or more processors and memory units configured to implement
a communication module that stores information and when activated reads and sends the information in to the RF transmitter to transmit an RF data signal via the antenna,
a biometric module that stores a user-initialized biometric password of at least two temporally displaced entries of one or more user-initialized biometric parameters representative of user-initialized biometric inputs, and in response to a sequence of biometric inputs from the one or more biometric sensors compares a sequence of biometric input signals to the stored biometric password and, upon determination of a match authenticates and authorizes that card user and activates the communication module for a specified session time period, said communication module in turn reads and sends the information to the RF transmitter to trans transmit an RF data signal via the antenna, wherein said communication module, although power is available from the external RF reader signal, will not active and transmit the information until activated by the biometric module, wherein said biometric module stores a connection attempt threshold and counts a card user's number of attempts to provide the sequence of biometric inputs to match the biometric password, and upon exceeding the connection attempt threshold said biometric module overwrites the information with a permanent error and transmits the permanent error in the RF data signal.

14. The secure data card of claim 13, wherein the card comprises at least first and second sensors for sensing at least first and second biometric inputs that correspond to different first and second user-initialized biometric inputs, said biometric password comprising at least a first entry for said first user-initialized biometric input and a second entry for said second user-initialized biometric input.

15. The secure data card of claim 13, wherein the card transmits the RF data signal in an open format to maintain backward compatibility with an installed base of RFID chip readers.

16. The secure data card of claim 13, wherein external reader signal induces an AC current in the antenna, said passive power module comprises a capacitor, a full wave rectifier that rectifies the AC current to produce an unregulated voltage across the capacitor and a voltage regulator that smoothes the unregulated voltage to supply the one or more voltages.

17. A secure data card, comprising:
a card;
an antenna tuned to receive an external RF reader signal;
at least one biometric sensor configured to sense a biometric input from a card user and generate a biometric input signal, said biometric input and biometric input signal providing distinctive and measurable characteristics to identify individual card users; and
at least one radio frequency identification (RFID) chip comprising
an RF transmitter, and
one or more processors and memory units configured to implement
a communication module that stores information and when activated reads the information and sends the information in to the RF transmitter to transmit an RF data signal via the antenna, and
a biometric module that stores a user-initialized biometric password of at least two temporally displaced entries of one or more user-initialized biometric inputs, and in response to a sequence of biometric inputs from the one or more biometric sensors compares a sequence of biometric input signals to the stored biometric password and, upon determination of a match of each biometric input and the temporal sequence of those biometric inputs activates the communication module, which in turn reads and sends the information to the RF transmitter to transmit an RF data signal via the antenna, wherein said communication module, although power is available, will not active and transmit the information until activated by the biometric module.

18. The secure data card of claim 17, wherein said biometric password comprises at least a first entry for a first user-initialized biometric input and a second entry for a different second user-initialized biometric input.

* * * * *